(12) United States Patent
Pantalone et al.

(10) Patent No.: US 8,798,075 B2
(45) Date of Patent: Aug. 5, 2014

(54) PEER TO PEER CONNECTION

(75) Inventors: Brett A. Pantalone, Pittsboro, NC (US); Anders Angelhag, Lund (SE); Jan Robert Tobias Ritzau, Veberöd (SE); William O. Camp, Jr., Chapel Hill, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 366 days.

(21) Appl. No.: 11/469,680

(22) Filed: Sep. 1, 2006

(65) Prior Publication Data

US 2008/0002698 A1    Jan. 3, 2008

Related U.S. Application Data

(60) Provisional application No. 60/806,274, filed on Jun. 30, 2006.

(51) Int. Cl.
*H04L 12/56* (2006.01)
(52) U.S. Cl.
USPC .................................................. 370/395.52
(58) Field of Classification Search
USPC .......... 370/312, 349, 395.2, 395.52, 439, 462
See application file for complete search history.

(56) References Cited

U.S. PATENT DOCUMENTS

| | | | |
|---|---|---|---|
| 2003/0105850 A1* | 6/2003 | Lean et al. | 709/223 |
| 2004/0142371 A1* | 7/2004 | Milosavljevic et al. | 435/6 |
| 2004/0142724 A1* | 7/2004 | Buttet | 455/556.1 |

FOREIGN PATENT DOCUMENTS

| | | |
|---|---|---|
| EP | 1 331 786 | 7/2003 |
| WO | 2004/064432 | 7/2004 |
| WO | WO 2004064432 A2 * | 7/2004 |
| WO | 2005/101873 | 10/2005 |

* cited by examiner

*Primary Examiner* — Yong Zhou
(74) *Attorney, Agent, or Firm* — Harrity & Harrity, LLP

(57) ABSTRACT

A method in a first device for setting up a peer-to-peer IP connection between the first device and a second device may include sending a request to a second device for setting up the peer-to-peer IP connection between the first device and the second device. The request may include an IP address of the first device. Alternatively, an IP address of the second device may be received in a message from the second device. The peer-to-peer IP connection between the first device and the second device is then set up. The setting up may be initiated by one of the parties associated with the first device or the second device by connecting to the other party using the IP address of the other party.

40 Claims, 3 Drawing Sheets

PEER TO PEER CONNECTION

RELATED APPLICATION

This application claims priority under 35 U.S.C. §119 based on U.S. Provisional Application No. 60/806,274, filed Jun. 30, 2006, the disclosure of which is hereby incorporated herein by reference.

TECHNICAL FIELD

The present invention relates generally to setting up connections and, more particularly, to setting up a peer-to-peer IP connection between communication devices.

BACKGROUND OF THE INVENTION

With the proliferation of portable multimedia devices and larger, cheaper memories for storing content, there is a growing desire for consumers to share personal media content between several portable devices. It has become more and more frequent for consumers to store media content on a portable device, such as, e.g., a mobile telephone, with a wireless data connection. Unfortunately, a connection between two mobile telephones is not sufficient to provide a peer-to-peer Internet Protocol (IP) connection and an access to the content. In today's solutions, a server is required to set up a peer-to-peer IP connection, which is time consuming and cumbersome. The server is used to keep track of IP addresses and to enable the connection. The server is effectively contacted by all possible parties and the server thus holds IP addresses associated with all the parties. Then when one party wished to call a second party, it contacts the server. The server finds the current IP address associated with the second party. The connection can be routed through the server.

SUMMARY OF THE INVENTION

Aspects of the invention provide a mechanism for setting up a peer-to-peer IP connection, where the mechanism is fast and easy for the users of the first and second devices.

In accordance with a first aspect of the present invention, a method in a first communication device (first device) for setting up a peer-to-peer IP connection between the first device and a second communication device (second device) is provided. The method comprises the steps of: sending in an Short Message Service (SMS), Multimedia Messaging Service (MMS) or similar message to the second device, a request for setting up the peer-to-peer IP connection between the first device and the second device; sending an IP address of the first device in a message to the second device, or receiving an IP address of the second device in a message from the second device; and setting up the peer-to-peer IP connection between the first device and the second device. The setting up is initiated by any one of the parties of the first device and the second device, having obtained the IP address of the other party in the step above, by connecting to the other party by means of the IP address of the other party.

In accordance with a second aspect of the present invention, a method in a second communication device (second device) for setting up a peer-to-peer IP connection between a first communication device (first device) and the second device is provided. The method comprises the steps of: receiving in an Short Message Service (SMS), Multimedia Messaging Service (MMS) or similar message from the first device, a request for setting up the peer-to-peer IP connection between the first device and the second device; receiving an IP address of the first device in a message from the first device, or sending an IP address of the second device in a message to the first device; and setting up the peer-to-peer IP connection between the first device and the second device. The setting up is initiated by any one of the parties of the first device and the second device, having obtained the IP address of the other party in the step above, by connecting to the other party by means of the IP address of the other party.

In accordance with a third aspect of the present invention, an arrangement in a first communication device is provided. The first device arrangement comprises a Short Message Service (SMS), Multimedia Messaging Service (MMS) or similar message communication unit, adapted to send, in an SMS, MMS or similar message to the second device, a request for setting up a peer-to-peer IP connection between the first device and a second communication device. The message communication unit is further adapted to send an IP address of the first device in a message to the second device, or receive an IP address of the second device in a message from the second device. The first device arrangement further comprises an IP communication unit adapted to set up the peer-to-peer IP connection between the first device and the second device. The setting up is initiated by any one of the parties of the first device and the second device, having obtained the IP address of the other party, by connecting to the other party by means of the IP address of the other party.

In accordance with a fourth aspect of the present invention, an arrangement in a second communication device is provided. The second device arrangement comprises a Short Message Service (SMS), Multimedia Messaging Service (MMS) or similar message communication unit adapted to receive, in an SMS, MMS or similar message from the first device, a request for setting up the peer-to-peer IP connection between the first device and the second device. The message communication unit is farther adapted to receive an IP address of the first device in a message from the first device, or send an IP address of the second device in a message to the first device; and the second device arrangement further comprises an IP communication unit adapted to set up the peer-to-peer IP connection between the first device and the second device. The setting up is initiated by any one of the parties of the first device and the second device, having obtained the IP address of the other party, by connecting to the other party by means of the IP address of the other party.

Since the request for setting up a peer-to-peer IP connection and the IP address are sent in a SMS, MMS or similar message, the peer-to-peer IP connection can be set up in a fast and easy way.

An advantage of the present invention is that standard network protocols may be used, which implies that networks do not require upgrades for the technology of the invention to work. Therefore, there is no need for any changes with respect to standard network protocols.

Another advantage associated with the present invention is that no server is required for setting up the peer-to-peer IP connection. Still another advantage is that communication devices also are easier to port. A further advantage of the present invention is that it does not require users to upload content to a public server.

Yet another advantage of the present invention is that it does not require a subscription to a third-party service. A further advantage of the present invention is that the mechanism is also easily extendible to media content stored on a home personal computer (PC) or media server. Another advantage of the present invention is that it will work with any device that has a temporary IP address and a secondary means of communication that has a stable address known to other parties.

DETAILED DESCRIPTION OF PREFERRED EMBODIMENTS

The invention is defined as a method and an arrangement which may be put into practice in the embodiments described below.

Figure 1:
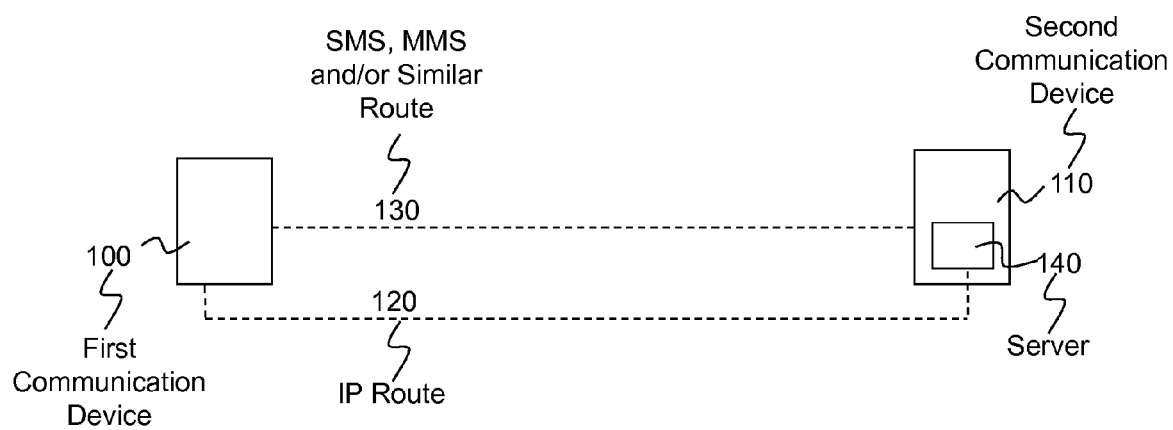
FIG. 1 is a schematic block diagram illustrating a first device communicating with a second device according to the present invention.

FIG. 1 shows a first communication device 100 (referred to herein as first device 100), adapted to communicate with a second communication device 110 (referred to herein as second device 110). The first device 100 and second device 110 are included in a communication system, such as, e.g., a radio communication system using technologies such as, e.g. Global System for Mobile communication (GSM), Wideband Code Division Multiple Access (WCDMA), a Plain Old Telephone Service system (POTS), or the Internet. The first device 100 and second device 110 may be, e.g., a portable device, a mobile phone, a Personal Digital Computer, a POTS device, a computer or any other communication device. The first device 100 and the second device 110 further have a respective IP address and a respective telephone number or some other kind of address that make them capable of communicating via Short Message Service (SMS), Multimedia Messaging Service (MMS) or similar, using an SMS, MMS bearer or a similar bearer that may be circuit switched or packet switched. This means that the respective first and second device 100, 110 may communicate via an IP route 120 and/or an SMS, MMS and/or similar route 130. For example, the first device 100 and second device 110 may include a Subscriber Identity Module (SIM) card or similar function, such as Universal Mobile Telecommunications System SIM (USIM) or IP Multimedia Subsystem SIM (ISIM), which function includes the telephone number or an other kind of address of the device. When describing the invention, the term "message" is used for any SMS, MMS or any similar message and/or service. The present method uses the feature of a communication system in which devices with a SIM card or a similar card/device, or a telephone number can directly be contacted as soon as the devices are turned on, via the SMS, MMS or similar bearer.

The present method may further use a feature used in SMS, MMS or similar, defined in some communication systems, such as radio communications systems, which directly address a specified port, not appearing in the device's normal SMS inbox and thereby auto start certain applications.

For example, if the first device 100 or the second device 110 is a computer with a SIM (or ISIM or USIM) card, it can connect to the Internet using, e.g., General Packet Radio Service (GPRS), and can send and receive an SMS, MMS or similar message using GSM. Such a computer can potentially also be connected to the Internet through a landline cable, such as, e.g., Asymmetric Digital Subscriber Line (ADSL) or a broadband access. With the SIM (or USIM, or ISIM or similar) card, it has an identity which makes it reachable. This identity can be its Mobile Station International Integrated Service Digital Network (MS ISDN) number, such as in the SMS case, or it can be a Session Initiation Protocol Uniform Resource Identifier (SIP URI), as is the case with ISIM (ISIM is the SIM card application used in the IMS case). The first device 110 and the second device can, e.g., send and receive SMS, MMS or similar messages over the GSM network or alternatively over the land line cable over the Internet with a direct connection to the Short Message Service Center (SMSC). In this document the term "telephone number" is used, but the term also covers any similar address making it possible to send and receive.

It is not likely that the SMS service over time is replaced by something else. A feature of the SMS, MMS or similar service that the first device 100 and second device 110 use is that the second device 110 is always available as soon as the user of the second device 110 installs the SIM (or USIM or ISIM) card into the second device 110. A similar service in the present method should also have this feature, but can be more efficiently implemented by using, e.g., the SIP URI identity instead of the MS ISDN. Therefore the present invention also covers alternative services to SMS.

Assume that the first device 100 wishes to set up a peer-to-peer IP connection between the first device 100 and the second device 110. The second device 110 is addressable by its telephone number or similar, independent of its actual IP address.

Figure 2:
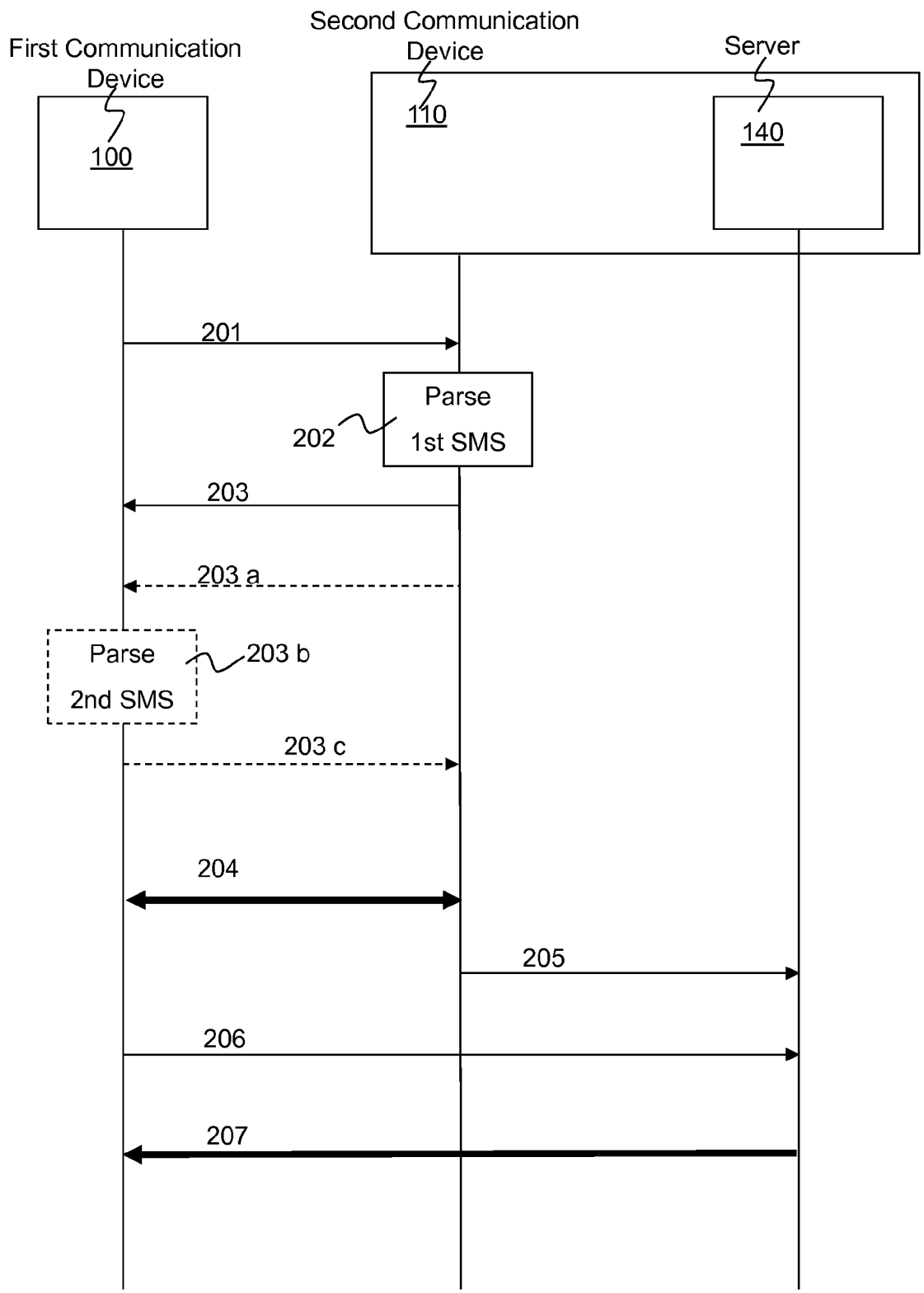
FIG. 2 is a combined flow chart and message sequence diagram describing a method for setting up a peer-to-peer IP connection between the first device and the second device according to the present invention.

FIG. 2 is a combined flow chart and message sequence diagram describing a method for initiating a peer-to-peer IP connection between the first device 100 and the second device 110 by using an SMS, MMS or similar message to initialize the IP connection. The method may comprise the following steps:

201. The first device 100 wishes to initiate a peer-to-peer IP connection between the first device 100 and the second device 110. As exemplary scenario may be that the user of the first device 100 wishes to share multimedia content with user of the second device 110 over the peer-to peer connection. The first device 100 sends a message to the second device 110, using the telephone number (or similar) of the second device 110. This message is also referred to as the first message herein. The message comprises a request for setting up a peer-to-peer IP connection between the first device 100 and the second device 110. The message may further comprise the IP address of the first device 100. In an alternative embodiment, the IP address of the second device 110 may be sent in a second message, which will be described below. The first message may farther comprise the telephone number of the first device 100. This is performed in a common way, i.e., information about the telephone number of a sender of an SMS, MMS or similar message is included in the SMS, MMS or similar message. This may be performed automatically, for example, by an application such as Internet browser application or an IP telephony application, e.g., if the first device 100 wishes to share an application with the second device 110, such as an IP telephony application that the first device 100 wishes to use for communicating with the second device 110. The user of the first device 100 then starts the application and chooses or enters the telephone number of the second device 110. The application then automatically sends the message to the same application in the second device 110. In that case, the message farther comprises a trigger to start the application in the second device. This may, e.g., be accomplished by the first device 100 addressing the first message to a specific port at the second device 110, which port is associated with the application. If the second device includes that application, it has registered that any message addressed to that specific port is associated with the application. The message then auto starts the application in the second device 110.

202. The message is parsed in the second device 110. In the parsing step, the request is identified, i.e., that the first device 100 wishes to initiate a peer-to-peer IP connection between the first device 100 and the second device 110. In this step, the sender may also be identified. This may be performed by identifying the telephone number, e.g., by checking the telephone number against a phone book in the second device. The second device 110 may comprise a user-defined list of user of devices who are allowed to form peer-to-peer IP connections to the second device 110. If there is such a list and the user of the second device 110 and/or the first device 100 is not on the list, the procedure ends and no peer-to-peer IP connection is set up.

203. When the request is identified, and if the IP address was included in the first message of the second device 110, the first device 100 is connected to the second device 110 for setting up a peer-to-peer IP connection between the first device 100 and the second device 110, using the IP address comprised in the first message. As described above, one example of performing the setting up automatically is if the first message was sent to a specific port in the second device 110. In this case, the port being associated to a specific application, the application in the second device 110 is started automatically. The application in the second device 110 then initiates the peer-to-peer IP connection between the application in the first device 100 and the same application in the second device 110. The first device 100 may be informed of the IP address of the second device 110 and an identification identifying the second device 110 during the set up.

In an alternative to step 203, three steps 203a, 203b and 203c may be taken, which steps are illustrated as dashed arrows and square 203a, 203b and 203c. In this alternative embodiment, no IP address was included in the first message and therefore the second device cannot initiate the peer-to-peer IP connection. Instead, the second device 110 provides the first device 100 with the IP address of the second device 110 and the first device 100 initiates the start up of the peer-to-peer IP connection.

203a. When the request is identified, the second device 110 replies to the first message from the first device 100 by sending a second message. This may be performed automatically without involving the user of the second device 110. The second message includes the current IP address of the second device 10. The second message may further include an identification number and a request for a peer-to-peer IP connection between the first device 100 and the second device 110.

203b. When the first device 100 receives the second message, i.e., the reply from the second device 110, the first device 100 parses the second message and extracts the IP address and also the identification if included.

203c. The first device 100 connects to the second device 110 for setting up a peer-to-peer IP connection between the first device 100 and the second device 110, using the IP address included in the second message. This may be performed automatically without involving the user of the first device 100.

204. The first device 100 may now communicate with the second device 110 using the set up peer-to-peer IP connection. In some implementations, as described in more detail below, the first device 100 and the second 110 may share the application.

In one embodiment, the user of the first device 100 wishes to use the peer-to-peer IP connection to browse on a server 140, e.g., a HyperText Transfer Protocol (HTTP) server, in the second device 110. The second device 110 includes the server 140 that provides any generic content that can be associated with any type of rendering program such as a browser, audio and or video codecs and also Global Positioning System (GPS) positions, Personal Information Management (PIM) and similar. The first device 100 and the second device 110 may include a respective Internet browser application. An Internet browser is a software application that enables a device to display and interact with text, images, and other information located on a HTTP server. Internet browsers communicate with HTTP servers to fetch information stored at the HTTP server. A simple Hypertext Markup Language (HTML) page can be dynamically generated to provide a list of available files. According to this embodiment, the present method includes further steps described in detail below.

205. The second device 110 starts an application to act as a server 140. This is performed by the trigger to start an application, e.g., an Internet browser application. In an exemplary implementation, the first message may be a trigger to start a server application in the second device 110, i.e., a software process to act as a multimedia network server at the Internet.

206. The first device 100 starts its Internet browser if not already started (e.g., the Internet browser may be started already in step 201 when sending the first message, as discussed above). The first device 100 uses the IP address of the second device 110 and possibly also the identification identifying the first device 100 included in the first or second message. By means of, e.g., the Internet browser, the first device 100 uses the IP address of the second device 110 for accessing server 140. This may be performed by the first device 100 sending a request to access the server 140 in the second device 110, to the IP address of the second device 110. The identification may be included in this request as an authentication measure and in this case, the server 140 lets the first device 100 access the server 140 if the identification is identified as authorized. Note that the identification may be further processed by the first device 100 in a previously agreed way, so that the second device 110 is further assured that the request to set up the peer-to-peer IP connection is from a legitimate user (e.g., the first device 100). The second device 111 recognizes the new signature from the identification it sent out and stores information indicating how the identification it sent out would be further processed by the first device 100. This enables the second device 110 to recognize the new signature.

207. The user of the first device 100 now can browse the content of the second device 110 and stream or download media files accessible from the Internet browser of the first device 100 and/or the second device 110.

In a similar way, the present method may be used to start instant messaging sessions, voice over IP connections, or any IP-based service between two devices. Also, by running a background task on a personal computer or media server, the personal computer can send an SMS, MMS or similar message to inform the device whenever the dynamic IP address of the server associated with the personal computer is updated. This allows the user of the device to access all content stored on the server associated with the computer.

Figure 3:
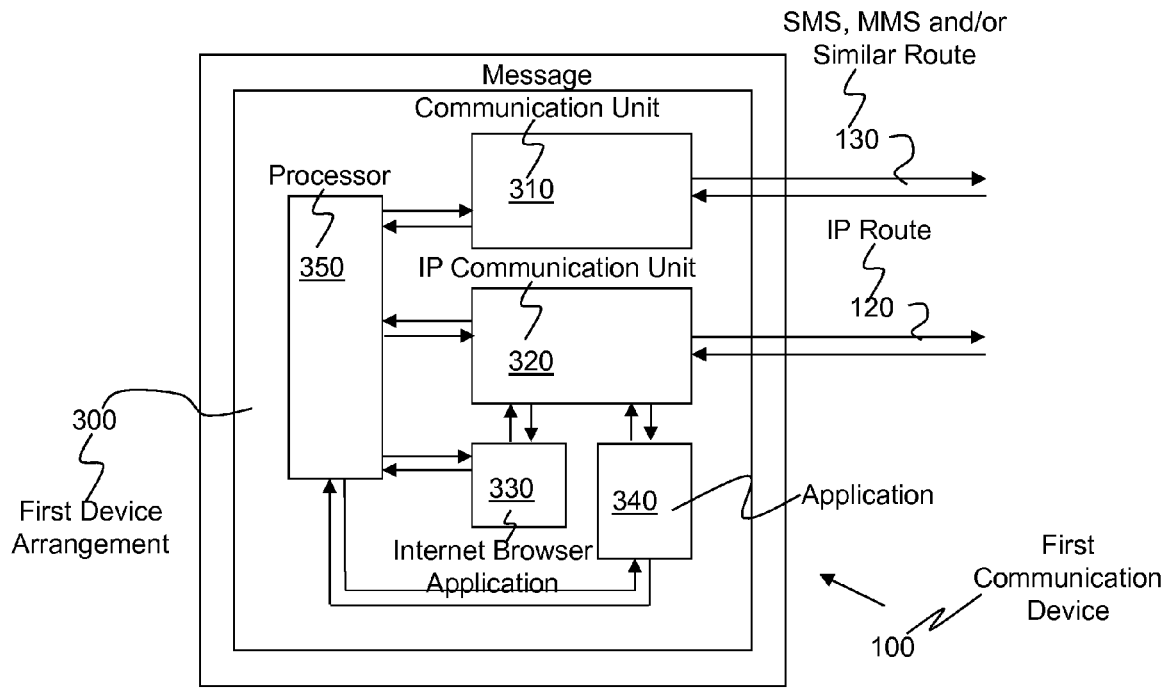
FIG. 3 is a schematic block diagram illustrating an arrangement in a first communication device according to the present invention.

In an exemplary implementation, to perform the steps described above in FIG. 2, the first device 100 includes an arrangement 300 as depicted in FIG. 3. The first device arrangement 300 comprises an SMS, MMS or similar message communication unit 310 (referred to herein as message communication unit 310) adapted to send in an SMS, MMS or similar message (referred to herein as the message) to the second device 110, a request for setting up a peer-to-peer IP connection between the first device 100 and the second device 110. The message communication unit 310 further is adapted to send an IP address of the first device 100 in a message to the second device 110, or receive an IP address of the second device 110 in a message from the second device 110. The message communication unit 310 may farther be adapted to send, in a message to the second device 110, an identification identifying the first device 100.

The first device arrangement 300 further comprises an IP communication unit 320 adapted to set up the peer-to-peer IP connection between the first device 100 and the second device 110, where the setting up is initiated by any one of the parties of the first device 100 and the second device 110, having obtained the IP address of the other party, by connecting to the other party by means of the IP address of the other party. The IP communication unit 320 may further be adapted to use the set up peer-to-peer IP connection for sending a request to the second device 110, requesting to access a server 140 in the second device 110.

The second device 110 may comprise an application to act as a server, e.g., an HTTP server, and the message communication unit 310 may further be adapted to send in a message to the second device 110, a trigger to start the application in the second device 110. The IP communication unit 320 may further be adapted to send to the second device 110, the identification together with the request to access the server 140, where the identification is adapted to be used by the second device 110 as an authentication measure before letting the first device 100 access the server 140. The first device arrangement 300 may comprise an Internet browser application 330 and the IP communication unit 320 may further be adapted to browse a server in the second device 110, using the Internet browser application 330 in the first device 100.

The first device arrangement 300 may further include an application 340, where the IP communication unit 320 may be configured to share the application 340 with the second device 110 using, for example, the set up peer-to-peer IP connection.

In one embodiment, the message communication unit 310 may be adapted to send the request for setting up the peer-to-peer IP connection between the first device 100 and the second device 110, and the IP address of the first device 100 in the same message to the second device 110 (e.g., the first message). The IP communication unit 320 may then be adapted to be connected by the second device 110, wherein the second device 110 is initiating the setting up of the peer-to-peer IP connection by means of the IP address of the first device 100 sent in the first message.

In another embodiment, the message communication unit 310 may be adapted to send the request for setting up the peer-to-peer IP connection between the first device 100 and the second device 110 in a first message, and receive the IP address of the second device 110 in a second message from the second device 110, which second message is a reply of the first message. The IP communication unit 320 may then be adapted to initiate the setting up of the peer-to-peer IP connection such that the first device 100 connects to the second device 110 by means of the IP address of second device 110 received in the second message.

The identification identifying the first device may he included in the first message in any of the above embodiments.

Figure 4:
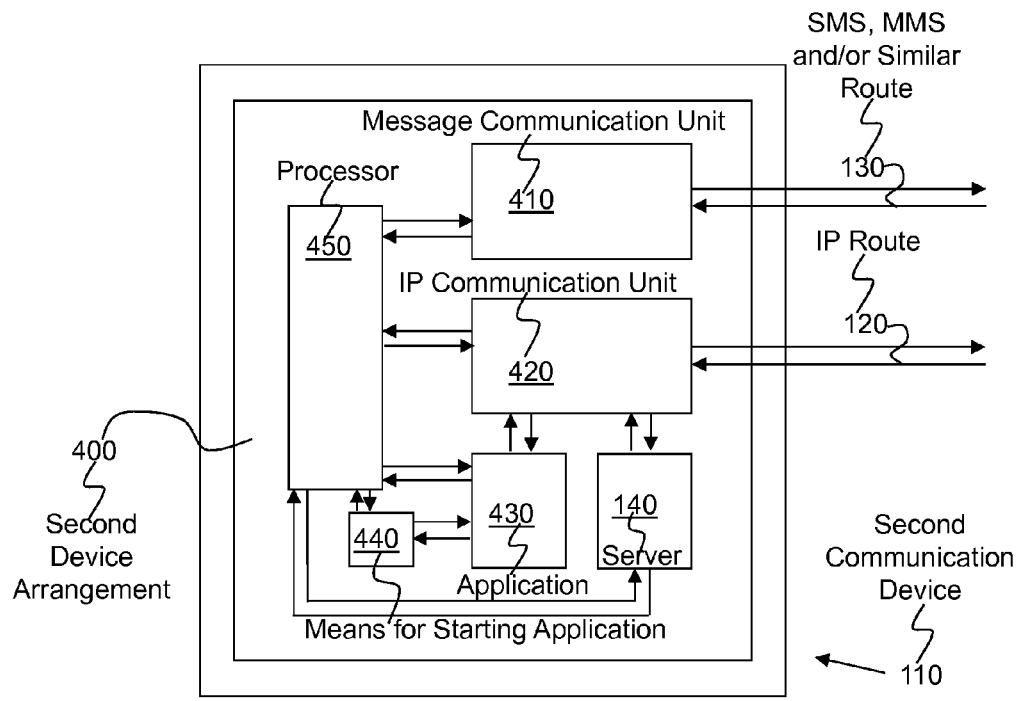
FIG. 4 is a schematic block diagram illustrating an arrangement in a second communication device according to the present invention.

In an exemplary implementation, to perform the steps described in FIG. 2, the second device 110 may include an arrangement 400 as depicted in FIG. 4. The second device arrangement 400 comprises an SMS, MMS or similar message communication unit 410 (message communication unit 410) adapted to receive in an SMS, MMS or similar message (message) from the first device 00, a request for setting up the peer-to-peer IP connection between the first device 100 and the second device 110. The message communication unit 410 is further adapted to receive an IP address of the first device 100 in a message from the first device 100, or send an IP address of the second device 110 in a message to the first device 100. The message communication unit 410 may further be adapted to receive in a message from the first device 100, an identification identifying the first device 100.

The second device arrangement 400 further comprises an IP communication unit 420 adapted to set up the peer-to-peer IP connection between the first device 100 and the second device 110, which setting up is initiated by any one of the parties of the first device 100 and the second device 110, having obtained the IP address of the other party, by connecting to the other party by means of the IP address of the other party. The IP communication unit 420 may be adapted to share an application with the first device 100, using the set up peer-to-peer IP connection.

The second device may include the server 140 and the IP communication unit 420 may further be adapted to receive on the set up peer-to-peer IP connection, a request from the first device 100 to access the server 140 in the second device 110. In other implementations, server 140 may be located externally from second device 110 and may be accessible to second device 110. The IP communication unit 420 may further be adapted to receive from the first device 100, the identification together with the request to access the server 140, which identification is adapted to be used by the second device 110 as an authentication measure before letting the first device 100 access the server 140. The second device 110 may include an application to act as a server 430 and the message communication unit 410 may further be adapted to receive a trigger to start the application in the second device 110, in a message from the first device 100. The second device arrangement 400 may further include means 440 for starting the application 430 to act as a server 140 by means of the trigger. The first device 100 may include an Internet browser application. The server 140 in the second device 110 may be adapted to be browsed on by the first device 100 using its Internet browser application.

In one embodiment, the message communication unit 410 may be adapted to receive the request for setting up the peer-to-peer IP connection between the first device 100 and the second device 110, and the IP address of the first device 100, in the same message from the first device 100. The IP communication unit 420 may then be adapted to initiate the set up of the peer-to-peer IP connection such that the second device 110 is connecting to the first device 100 by means of the IP address of the first device 100 received in the first message.

In another embodiment, the message communication unit 410 may be adapted to receive the request for setting up the peer-to-peer IP connection between the first device 100 and the second device 110 in a first message from the first device 100. The message communication unit 410 may further be adapted to send the IP address of the second device 110 in a second message to the first device 100, which second message is a reply of the first message. The IP communication unit 420 may then be adapted to be connected by the first device 100 by means of the IP address of second device 110 sent in the second message, for setting up of the peer-to-peer IP connection.

The identification identifying the first device 100 may be included in the first message.

The present mechanism for setting up a peer-to-peer IP connection can be implemented through one or more processors, such as processor 350 in the first device 100 depicted in FIG. 3 and/or the processor 450 in the second device 110 depicted in FIG. 4, together with computer program code for performing the functions described herein. The program code mentioned above may also be provided as a computer program product, for instance in the form of a data carrier carrying computer program code for performing the present method when being loaded into the first device. One such carrier may be in the form of a CD ROM disc. It is, however, feasible to use other data carriers, such as a memory stick or any other computer readable medium. The computer program code can furthermore be provided as pure program code on a server and downloaded to the first device 100 and/or second device 110 remotely.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The present invention is not limited to the above-describe preferred embodiments. Various alternatives, modifications and equivalents may be used. Therefore, the above embodiments should not be taken as limiting the scope of the invention, which is defined by the appending claims and their equivalents.

What is claimed:

1. A method in a first communication device for setting up a peer-to-peer IP connection between the first communication device and a second communication device, where the first communication device is associated with a first Subscriber Identity Module (SIM) and the second communication device is associated with a second SIM, the method comprising:
   sending, to the second communication device, using a messaging service that is available to the first communication device based on the first communication device being associated with the first SIM, a request for setting up the peer-to-peer IP connection between the first communication device and the second communication device,
      the request being directed to a particular port of the second communication device,
         the particular port being associated with an application,
            the request causing the application to automatically start in the second communication device based on the second communication device receiving the request via the particular port;
   receiving, by the first communication device and from the second communication device, an identifier identifying the first communication device and an IP address of the second communication device,
      the identifier and the IP address of the second communication device being included in a message received from the second communication device,
         the message being sent by the second communication device based on the request being directed to the particular port;
   processing, by the first communication device, the identifier to form a signature associated with the first communication device,
      the signature being different from the identifier;
   sending, by the first communication device, the signature to the IP address of the second communication device to set up the peer-to-peer IP connection between the first communication device and the second communication device,
      the second communication device authenticating the first communication device based on the signature, and
      the peer-to-peer IP connection between the first communication device and the second communication device being set up based on the second communication device authenticating the first communication device based on the signature.

2. The method according to claim 1, further comprising:
   sharing an application with the second communication device using the set up peer-to-peer IP connection.

3. The method according to claim 1, where the second communication device includes a server, and
   where the method further comprises:
      using the set up peer-to-peer IP connection for sending a request to the second communication device for requesting access to the server.

4. The method according to claim 3, further comprising:
   sending in a message to the second communication device, an identification identifying the first communication device along with the request to access the server,
      where the identification is used by the second communication device as an authentication measure for accessing the server.

5. The method according to claim 4, where the first communication device includes an Internet browser application, and
   where the method further comprises:
      browsing the server in the second communication device using the Internet browser application in the first communication device.

6. The method according to claim 1, where the second communication device includes an application to act as a server, and
   where the method further comprises:
      sending, in a message to the second communication device, a trigger to start the application to act as the server in the second communication device.

7. The method according to claim 1, where the request for setting up the peer-to-peer IP connection between the first communication device and the second communication device, and an IP address of the first communication device are sent in a first message to the second communication device.

8. The method according to claim 1, where the request for setting up the peer-to-peer IP connection between the first communication device and the second communication device is sent in a first message, where the IP address of the second communication device is received in the message from the second communication device, where the message from the second communication device is a reply to the first message, and where the first communication device initiates the setting up of the peer-to-peer IP connection between the first communication device and the second communication device using the IP address of second communication device received in the message from the second communication device.

9. The method according to claim 1, where the IP address of the second communication device is a dynamic IP address, the method further comprising:

receiving, by the first communication device, a short message service message from the second communication device, the short message service message including information identifying an updated dynamic IP address of the second communication device.

10. A computer program product for setting up a peer-to-peer IP connection between a first communication device and a second communication device, where the first communication device is associated with a first Subscriber Identity Module (SIM) and the second communication device is associated with a second SIM, the computer program product comprising computer program code that, when executed by a processor included in the first communication device, causes the processor to:

send, to the second communication device, using a messaging service that is available to the first communication device based on the first communication device being associated with the first SIM, a request for setting up the peer-to-peer IP connection between the first communication device and the second communication device, the request being directed to a particular port of the second communication device, the particular port being associated with an application, the request causing the application to automatically start in the second communication device based on the second communication device receiving the request via the particular port, the application not running in the second communication device before the second communication device receives the request, and the application including an Internet browser application;

receive an IP address of the second communication device and an identifier identifying the first communication device in a message from the second communication device, the message being sent by the second communication device based on the request being directed to the particular port;

process, by the first communication device, the identifier to form a signature associated with the first communication device, the signature being different from the identifier; and send, by the first communication device, the signature to the IP address of the second communication device to set up the peer-to-peer IP connection between the first communication device and the second communication device, the second communication device authenticating the first communication device based on the signature, and the peer-to-peer IP connection between the first communication device and the second communication device being set up based on the second communication device authenticating the first communication device based on the signature.

11. A method in a second device for setting up a peer-to-peer IP connection between a first device and the second device, where the first device is associated with a first Subscriber Identity Module (SIM) and the second device is associated with a second SIM, the method comprising:

receiving, by the second device and from the first device, using a messaging service that is available to the second device based on the second device being associated with the second SIM, a request for setting up the peer-to-peer IP connection between the first device and the second device, the request being received at a particular port of the second device;

determining, by the second device and based on receiving the message at the particular port, that the request is associated with an application;

automatically starting, by the second device, the application in the second device based on the request being associated with the application;

sending, by the second device, a message to the first device, the message to the first device including an identifier identifying the first device and an IP address of the second device;

storing, by the second device, information indicating how the identifier will be processed by the first device;

receiving, by the second device and from the first device, a signature and an IP address of the first device, the first device processing the identifier to generate the signature, and the first device sending the signature and the IP address of the first device to the IP address of the second device;

authenticating, by the second device, the first device based on the signature and the stored information; and setting up, by the second device, the peer-to-peer IP connection between the first device and the second device based on the IP address of the first device, the second device setting up the peer-to-peer IP connection between the first device and the second device by connecting to the first device using the IP address of the first device.

12. The method according to claim 11, further comprising: sharing an application, with the first device, using the set up peer-to-peer IP connection.

13. The method according to claim 11, where the second device includes a server, and where the method further comprises:

receiving via the peer-to-peer IP connection between the first device and the second device, a request, from the first device, to access the server included in the second device.

14. The method according to claim 13, further comprising:

receiving in a message from the first device, an identification identifying the first device with the request to access the server, where the identification is used by the second device as an authentication measure for allowing the first device to access the server.

15. The method according to claim 13, where the first device comprises an Internet browser application, the method further comprising:
receiving a request to browse the server by the first device using the Internet browser application.

16. The method according to claim 11, where the second device includes an application to act as a server, and
where the method further comprises:
receiving, in a message from the first device, a trigger to start the application in the second device; and
starting the application to act as a server based on receiving the trigger.

17. The method according to claim 11, where the request for setting up the peer-to-peer IP connection between the first device and the second device and an IP address of the first device are received, by the second device, in a first message from the first device.

18. The method according to claim 11, where the request for setting up the peer-to-peer IP connection between the first device and the second device is received in a first message from the first device, and
where the IP address of the second device is sent in a second message to the first device,
where the second device sends the second message, to the first device, as a reply to the first message.

19. The method according to claim 11, where the IP address of the second device is an dynamic IP address, the method further comprising:
determining that the dynamic IP address has been updated; and
sending a short message service message to the first device,
where information identifying the updated dynamic IP address is included in the short message service message.

20. A computer program product for setting up a peer-to-peer IP connection between a first communication device and a second communication device, where the first communication device is associated with a first Subscriber Identity Module (SIM) and the second communication device is associated with a second SIM, the computer program product comprising computer program code that, when executed by a processor included in the second communication device, cause the processor to:
receive, from the first communication device, using a messaging service that is available to the second communication device based on the second communication device being associated with the second SIM, a request for setting up the peer-to-peer IP connection between the first communication device and the second communication device,
the request being received at a particular port of the second communication device;
determine, based on receiving the message at the particular port, that the request is associated with an application;
automatically start the application in the second communication device based on the request being associated with the application;
send an identifier identifying the first communication device and an IP address of the second communication device in a message to the first communication device;
store information indicating how the identifier will be processed by the first communication device;
receive, from the first communication device, a signature and an IP address of the first communication device,
the first communication device processing the identifier to generate the signature, and
the first communication device sending the signature and the IP address of the first communication device to the IP address of the second communication device;
authenticate the first communication device based on the signature and the stored information; and
set up the peer-to-peer IP connection between the first communication device and the second communication device based on the IP address of the first communication device,
the second communication device setting up the peer-to-peer IP connection between the first communication device and the second communication device by connecting to the first communication device using the IP address of the first communication device.

21. A first device, comprising:
a first Subscriber Identity Module (SIM);
a message communication unit to:
send, using a messaging service that is available to the first device based on the first device being associated with the first SIM, a message to a second device that is associated with a second SIM,
the message including a request for setting up a peer-to-peer IP connection between the first device and the second device,
the request being directed to a particular port of the second device,
the particular port being associated with an application,
the request causing the application to automatically start in the second device based on the second device receiving the request via the particular port,
receive an identifier associated with the first device and an IP address of the second device in a message from the second device,
the message being sent by the second device based on the request being directed to the particular port,
process the identifier to form a signature associated with the first device,
the signature being different from the identifier; and
an IP communication unit to:
send the signature to the IP address of the second device to set up the peer-to-peer IP connection between the first device and the second device,
the second device authenticating the first device based on the signature, and
the peer-to-peer IP connection between the first device and the second device being set up based on the second device authenticating the first device.

22. The first device according to claim 21, further comprising:
a second application,
where the IP communication unit is further to:
share the second application with the second device using the set up peer-to-peer IP connection.

23. The first device according to claim 21, where the IP communication unit is further to:
send, via the peer-to-peer IP connection, a request, to the second device, to access a server in the second device.

24. The first device according to claim 23, where the message communication unit is further to:
send, in a message to the second device, an identification identifying the first device together with the request to access the server.

25. The first device according to claim 21, where the second device comprises a second application to act as a server, and where the message communication unit is further to:
send, in a message to the second device, a trigger to start the second application in the second device.

26. The first device according to claim 25, where the server is a HTTP server,
where the first device comprises an Internet browser application, and
where the IP communication unit is further to:
browse the HTTP server in the second device using the Internet browser application in the first device.

27. The first device according to claim 21, where, when sending the message to the second device, the message communication unit is to:
send the request for setting up the peer-to-peer IP connection between the first device and the second device and the IP address of the first device to the second device.

28. The first device according to claim 21, where the message communication unit is further to:
send the request for setting up the peer-to-peer IP connection between the first device and the second device in a first message, and
receive, from the second device, the IP address of the second device in a second message,
where the second device sends the second message as a reply to the first message.

29. The first device according to claim 21, where the IP address of the second communication device is a dynamic IP address; and
where the message communication unit is further to:
receive, from the second device, a short message service message,
the short message service message including information identifying an updated dynamic IP address of the second device.

30. The first device of claim 21, where the first device comprises a mobile phone.

31. A first device, comprising:
a first Subscriber Identity Module (SIM);
a message communication unit to:
receive, in a message from a second device that is associated with a second SIM, a request for setting up a peer-to-peer IP connection between the first device and the second device,
the request being received at a particular port of the first device;
determine, based on receiving the request at the particular port, that the request is associated with an application,
automatically start the application in the first device based on receiving the request being associated with the application, and
send a message to the second device,
the message to the second device including an identifier identifying the second device and an IP address of the first device,
store information indicating how the identifier will be processed by the second device,
receive, from the second device, a signature and an IP address of the second device,
the second device processing the identifier to generate the signature, and
the second device sending the signature and the IP address of the second device to the IP address of the first device, and
authenticate the second device based on the signature and the stored information; and
an IP communication unit to:
set up the peer-to-peer IP connection between the first device and the second device using the IP address of the second device.

32. The first device of claim 31, where the IP communication unit is further to share a second application with the second device using the set up peer-to-peer IP connection.

33. The first device of claim 31, further comprising:
a server, and
where the IP communication unit is further to:
receive, via the peer-to-peer IP connection, a request from the second device to access the server.

34. The first device of claim 33, where the message communication unit is further to:
receive, in a message from the second device, an identification identifying the second device with the request to access the server,
the identification being used by the first device as an authentication measure before allowing the second device access to the server.

35. The first device of claim 33, where the server is a HTTP server,
where the second device includes an Internet browser application, and
where the HTTP server is to be browsed by the second device using the Internet browser application.

36. The first device of claim 31, where the first device further comprises:
a second application to act as a server, and
the message communication unit being further to:
receive a trigger to start the second application in a message from the second device,
where the first device starts the second application based on receiving the trigger.

37. The first device of claim 31, where the message communication unit is to receive the request for setting up the peer-to-peer IP connection in a first message from the second device, and
where the IP communication unit is connected to the second device, via the peer-to-peer IP connection, using the IP address of the second device received in the first message.

38. The first device of claim 31, where the message communication unit is to receive the request for setting up the peer-to-peer IP connection in a first message from the second device, and
where the message communication unit is to send the IP address of the first device in a second message to the second device,
where the first device sends the second message to the second device as a reply to the first message.

39. The first device of claim 31, where the IP address of the first device is a dynamic IP address, and
where, when the dynamic IP address is updated, the first device sends the updated dynamic IP address to the second device via a short message service message.

40. The first device of claim 31, where the first device comprises a mobile phone.

* * * * *